United States Patent
Karthaus (10) Patent No.: US 9,499,071 B2
(45) Date of Patent: Nov. 22, 2016

(54) ADJUSTING DEVICE FOR A MOTOR VEHICLE SEAT, COMPRISING AT LEAST ONE STOP

(75) Inventor: Ulrich Karthaus, Remscheid (DE)

(73) Assignee: C. Rob. Hammerstein GmbH & Co. KG, Solingen (DE)

( * ) Notice: Subject to any disclaimer, the term of this patent is extended or adjusted under 35 U.S.C. 154(b) by 241 days.

(21) Appl. No.: 14/233,609

(22) PCT Filed: Jul. 12, 2012

(86) PCT No.: PCT/EP2012/063631
§ 371 (c)(1),
(2), (4) Date: May 5, 2014

(87) PCT Pub. No.: WO2013/010892
PCT Pub. Date: Jan. 24, 2013

(65) Prior Publication Data
US 2014/0319894 A1    Oct. 30, 2014

(30) Foreign Application Priority Data

Jul. 20, 2011  (DE) .................. 10 2011 079 497

(51) Int. Cl.
*B60N 2/02*  (2006.01)
*B60N 2/16*  (2006.01)
*B60N 2/44*  (2006.01)

(52) U.S. Cl.
CPC ........... *B60N 2/0224* (2013.01); *B60N 2/0232* (2013.01); *B60N 2/167* (2013.01); *B60N 2/1655* (2013.01); *B60N 2/4435* (2013.01); *B60N 2/4445* (2013.01); *B60N 2002/0236* (2013.01)

(58) Field of Classification Search
CPC ......... B60N 2/22; B60N 2/2252; B60N 2/23

USPC ................................. 297/361.1, 362, 362.12
See application file for complete search history.

(56) References Cited

U.S. PATENT DOCUMENTS

| | | | | |
|---|---|---|---|---|
| 3,958,828 A | * | 5/1976 | Ishida | B60N 2/2218 297/361.1 |
| 5,725,452 A | * | 3/1998 | Droulon | B60N 2/2252 297/362 |

(Continued)

FOREIGN PATENT DOCUMENTS

| | | |
|---|---|---|
| DE | 1 925 778 A1 | 11/1970 |
| DE | 36 16 290 A1 | 11/1987 |

(Continued)

OTHER PUBLICATIONS

International Search Report mailed Apr. 10, 2013, as received in International Application No. PCT/EP2012/063631.

*Primary Examiner* — David R Dunn
*Assistant Examiner* — Alexander Harrison
(74) *Attorney, Agent, or Firm* — Foley & Lardner LLP (57) ABSTRACT

An adjusting device for a hinge mount of a motor vehicle seat has a housing part, a drive unit, a gear unit which is mounted downstream of the drive unit, is driven by the drive unit, has at least one self-locking gear and drives an output shaft, an element which can be adjusted about an axis of the hinge mount, is rotationally connected to the output shaft and can be adjusted in an angle range ≤360°, preferably ≤90° about the axis of the hinge mount, and at least one stop mechanism which delimits the swivel range of the arm in at least one swivel direction. The stop mechanism is mounted between a) the self-locking gear and the drive unit, b) the self-locking gear and the housing part and/or c) the drive unit and the housing part.

6 Claims, 10 Drawing Sheets

(56) References Cited

U.S. PATENT DOCUMENTS

| | | | | |
|---|---|---|---|---|
| 6,283,886 B1* | 9/2001 | Schumann | B60N 2/4435 | 192/15 |
| 6,637,821 B2* | 10/2003 | Lee | B60N 2/2352 | 297/362 |
| 6,805,650 B2* | 10/2004 | Branov | B60N 2/2254 | 297/362 |
| 7,235,030 B2* | 6/2007 | Becker | B60N 2/225 | 297/362 |
| 7,461,900 B2* | 12/2008 | Lange | B60N 2/2252 | 297/362 |
| 7,497,519 B2* | 3/2009 | Dill | B60N 2/2252 | 297/362 |
| 7,753,450 B2* | 7/2010 | Eppert | B60N 2/2254 | 297/361.1 |
| 7,878,593 B2* | 2/2011 | Nae | B60N 2/2252 | 297/362 |
| 8,152,241 B2* | 4/2012 | Krueger | B60N 2/2252 | 297/362 |
| 8,672,408 B2* | 3/2014 | Legras | B60N 2/2255 | 297/361.1 |
| 8,672,796 B2* | 3/2014 | Schulz | B60N 2/1655 | 192/223.2 |
| 8,720,661 B2* | 5/2014 | Karthaus | B60N 2/2257 | 188/82.84 |
| 8,915,548 B2* | 12/2014 | Stilleke | B60N 2/2252 | 297/361.1 |
| 9,033,418 B2* | 5/2015 | Jokiel | B60N 2/2254 | 297/362 |
| 2003/0067201 A1* | 4/2003 | Koczewski | B60N 2/224 | 297/361.1 |
| 2006/0006717 A1* | 1/2006 | Sakamoto | B60N 2/433 | 297/361.1 |
| 2006/0226686 A1* | 10/2006 | Yu | B60N 2/42745 | 297/361.1 |
| 2008/0001457 A1* | 1/2008 | Reed | B60N 2/06 | 297/361.1 |
| 2008/0136242 A1* | 6/2008 | Stemmer | B60N 2/2254 | 297/362 |
| 2008/0197686 A1* | 8/2008 | Liebich | B60N 2/2254 | 297/361.1 |
| 2010/0201174 A1* | 8/2010 | Ito | B60N 2/0232 | 297/362 |
| 2010/0244530 A1* | 9/2010 | Kitano | B60N 2/20 | 297/362 |
| 2010/0308634 A1* | 12/2010 | Narita | B60N 2/0232 | 297/362 |
| 2011/0169312 A1* | 7/2011 | Desquesne | B60N 2/2254 | 297/362 |
| 2011/0169313 A1* | 7/2011 | Schulz | B60N 2/2257 | 297/362 |
| 2012/0001471 A1* | 1/2012 | Wei | B60N 2/2252 | 297/362 |
| 2012/0223562 A1* | 9/2012 | Assmann | B60N 2/2356 | 297/362 |
| 2013/0009438 A1* | 1/2013 | Stemmer | B60N 2/0232 | 297/362 |
| 2013/0009439 A1* | 1/2013 | Jokiel | B60N 2/2252 | 297/362 |
| 2013/0207434 A1* | 8/2013 | Stilleke | B60N 2/225 | 297/362 |
| 2013/0214578 A1* | 8/2013 | Stilleke | B60N 2/2252 | 297/362 |
| 2014/0097659 A1* | 4/2014 | Wahls | B60N 2/6009 | 297/362 |

FOREIGN PATENT DOCUMENTS

| | | |
|---|---|---|
| DE | 44 00 910 A1 | 7/1995 |
| DE | 197 05 485 C1 | 4/1998 |
| DE | 10 2011 051 988 A1 | 1/2013 |
| WO | WO-98/25791 A1 | 6/1998 |

\* cited by examiner

ADJUSTING DEVICE FOR A MOTOR VEHICLE SEAT, COMPRISING AT LEAST ONE STOP

CROSS REFERENCE TO RELATED APPLICATIONS

The present application is a U.S. National Stage of International Application No. PCT/EP2012/063631, filed Jul. 12, 2012, which claims the benefit of German Patent Application No. 10 2011 079 497.2, filed Jul. 20, 2011, the entire disclosures of all of which are incorporated herein by reference.

The invention relates to an adjustment device for a pivot joint fitting of a motor vehicle seat with a) a housing portion, with b) a drive unit, with c) a gear unit, which is downstream from the drive unit, is driven by the drive unit, has at least one self-locking gear and drives an output shaft, with d) an element that can be adjusted about an axis of the pivot joint fitting, is rotationally connected to the output shaft and is adjustable in an angle range ≤360°, preferably ≤90°, about the axis of the joint fitting, and with e) at least one stop means that limits the pivoting range of the element at least in one first pivoting direction.

According to the prior art, stops are allocated to the element of the motor vehicle seat to be adjusted, for example to a rocker for a height adjustment mechanism of the front edge of the seat. They limit the range in which the element to be adjusted can be moved. In particular, they limit the range in which the element can be pivoted. Stops of this kind as they are known from the prior art are drawn in FIG. 1 with the reference numerals 200 and 202. They limit the possible pivoting path of the rocker 26 forming the element to be adjusted.

Such a stop, which acts on the element to be adjusted itself, has its disadvantages. If the adjustment device is moved through its drive unit to such an extent that the element comes up against one of the stops, each additional torque introduced into the drive unit results in the drive unit, the gear unit and the other parts being subjected to load. In the case of a gear unit having a self-locking gear, e.g. a wobble gear or a gear with a worm and worm wheel, the load results in an interlocking of the gear. This is also referred to as "winding up" the gear unit. The higher the torques introduced into the drive unit, the more the gear is subjected to load and increasingly gets into an interlocked or jamming state. Later, it can be moved out of this state by a reversal of movement only while producing noise, most frequently a clicking. In the case of a reversal of movement, a breakaway takes place. All of this is disadvantageous.

Based on this, the invention has set itself the task of proposing improved stops for an adjustment device of the type mentioned in the introduction. On the one hand, the stops are to be capable of being positioned better, i.e. a more precise setting of the angle range is supposed to be possible, on the other hand, an interlocking or winding-up of the gear unit is to be avoided.

Based on an adjustment device of the type mentioned in the introduction, this object is achieved by the stop means being disposed between a) the self-locking gear and the drive unit, b) the self-locking gear and the housing portion and/or c) the drive unit and the housing portion.

According to the invention, the stops no longer work directly on the element to be adjusted. They are repositioned away from the element to be adjusted into the area between the drive unit and gear unit. Since the gear unit usually comprises a transmission, an error in the positioning of the stop according to the invention is less noticeable by the dimension of the transmission than in the case of a positioning of the stops in accordance with the prior art. Thus, a more precise positioning is obtained.

Furthermore, it is now no longer possible to interlock the self-locking gear. Before an interlock occurs, the drive of the self-locking gear is blocked. This occurs due to stop means which then prevent the self-locking gear from turning further when the element to be adjusted is located in one of the end regions of its pivoting path. When the stop according to the invention has been reached and a user moves the drive unit further still, he will perceive a precise stop that is not influenced by the elastic properties of the gear. Thus, the user is provided with a clear tactile feedback that the stop has now been reached. This is different in the prior art, because here, the elasticity of the self-locking gear still plays a role which causes a stopping behavior which is not as clearly perceptible.

In an advantageous development, the drive unit is configured as a manually operable rotary knob preferably associated with a reduction gear. Alternatively, it is configured as a step-by-step switch with a manually operable lever. It can also comprise an electric motor. In the latter case, the output shaft of the electric motor is preferably connected to a worm that is in engagement with a worm wheel formed by a control gear wheel.

The stop means can be configured in any way. In the following description, a stop of the stop means is configured as a pin. Such a configuration is not to be understood as being limiting; other options of configuring the stop of the stop means are familiar to the person skilled in the art. In the following description, a single pin with two opposite surfaces respectively forms a stop in both pivoting directions. In an alternative, these two surfaces can also be formed on two components that need not have the shape of a pin. Also, the counter-stop cooperating with the stop can be extensively changed and configured differently by the person skilled in the art. The counter-stops shown here are also to be understood to be mere suggestive examples. The stop means forms at least one stop.

Other advantages and features of the invention become apparent from the other claims as well as from the following description of three exemplary embodiments of the invention, which are to be understood not to be limiting and which will be explained below with reference to the drawings. In the drawing:

The adjustment device has an output shaft 20 rotating about an axis 22. The output shaft 20 has a non-round accommodating portion 24 for a rocker 26. The angular position of this rocker 26 is adjusted by the adjustment device; for example, the rocker 26 is assigned to an adjustment device for the height of the front edge of the seat or to another adjustment device of a motor vehicle seat (not shown). The rocker 26 shown is an example for an element of the motor vehicle seat to be adjusted.

An external gear wheel 28 is connected to the output shaft 20. Furthermore, a bearing pin 30 is provided which is centric with respect to the axis 22 and is located, for example, in a bore hole of the output shaft 20 or is integral with this output shaft 20.

The output shaft 20 is rotatably mounted in a housing portion 32; more precisely, it is rotatably mounted in a bearing bore 34. The bearing bore 34 is centric to the axis 22. The housing portion 32 forms an internal toothing 36; it is centric to the axis 22.

An annular gear wheel 38 is provided which comprises an external annular gear 40 and an internal annular gear 42 concentric thereto. The annular gear wheel 38 moreover has an annular bore 44. The external annular gear 40, the internal annular gear 42 and the annular bore 44 are centric to an axis which is parallel to the axis 22 and is displaced parallel relative thereto by an eccentricity quantity e. The external annular gear 40 is in a wobbling engagement with the internal toothing 36. The external gear wheel 28 is also in a wobbling engagement with the internal annular gear 42. The internal toothing 36 and the external annular gear 40 form a first wobble stage. The internal annular gear 42 and the external gear wheel 28 form a second wobble stage. The eccentricity e of the two wobble stages has the same value e. The two eccentricities are offset relative to each other by 180°.

A control gear wheel 46 is provided. The control gear wheel 46 has a bore hole that is centric to the axis 22. An eccentric protrusion 48 extends around this bore hole. It has the shape of a cylinder; the cylinder axis is offset by the quantity e relative to the axis 22. The cylinder is shaped in such a way that it fills the annular bore 44 and the annular gear wheel 38 can be rotated about the protrusion 48. The above-described dual wobble stage forms the gear unit. Specifically, the parts 28, 38 (with 40, 42 and 44) and 48 belong to the gear unit.

A stop means is disposed between the control gear wheel 46 and the annular gear wheel 38. It has a pin 50 which protrudes on the control gear wheel 46 offset to the protrusion 48 and in the same direction as this protrusion 48. The pin 50 forms a stop of the stop means. The pin 50 reaches into an arc-shaped groove 52 formed on the facing lateral surface of the annular gear wheel 38. This groove 52 extends over almost 360°. It has two groove ends which each form a counter-stop of the stop means. The groove 52 is centric to the cylinder axis; this is apparent particularly from FIG. 6. The pin 50 forms a stop for both pivoting directions. It is also possible to provide separate stops for both pivoting directions. Accordingly, in the first exemplary embodiment, the first stop means is formed by a surface of the pin 50 and a groove end of the groove 52. The second stop means is formed by another surface of the pin 50 and the other groove end of the groove 52.

The eccentric protrusion 48 drives the annular gear wheel 38 to execute a wobbling movement. As long as the pin 50 is not situated at an end of the groove 52, the eccentric protrusion 48 can be moved in both directions of rotation by rotating the control gear wheel 46. When the pin 50 comes to rest against one end of the groove 52, this driving movement in the respective direction is complete; a further rotary movement of the control gear wheel 46 is now no longer possible. Due to the cooperation of the pin 50 and the ends of the groove 52, end stops are obtained that determine the range of movement of the rocker 26.

Figure 1:
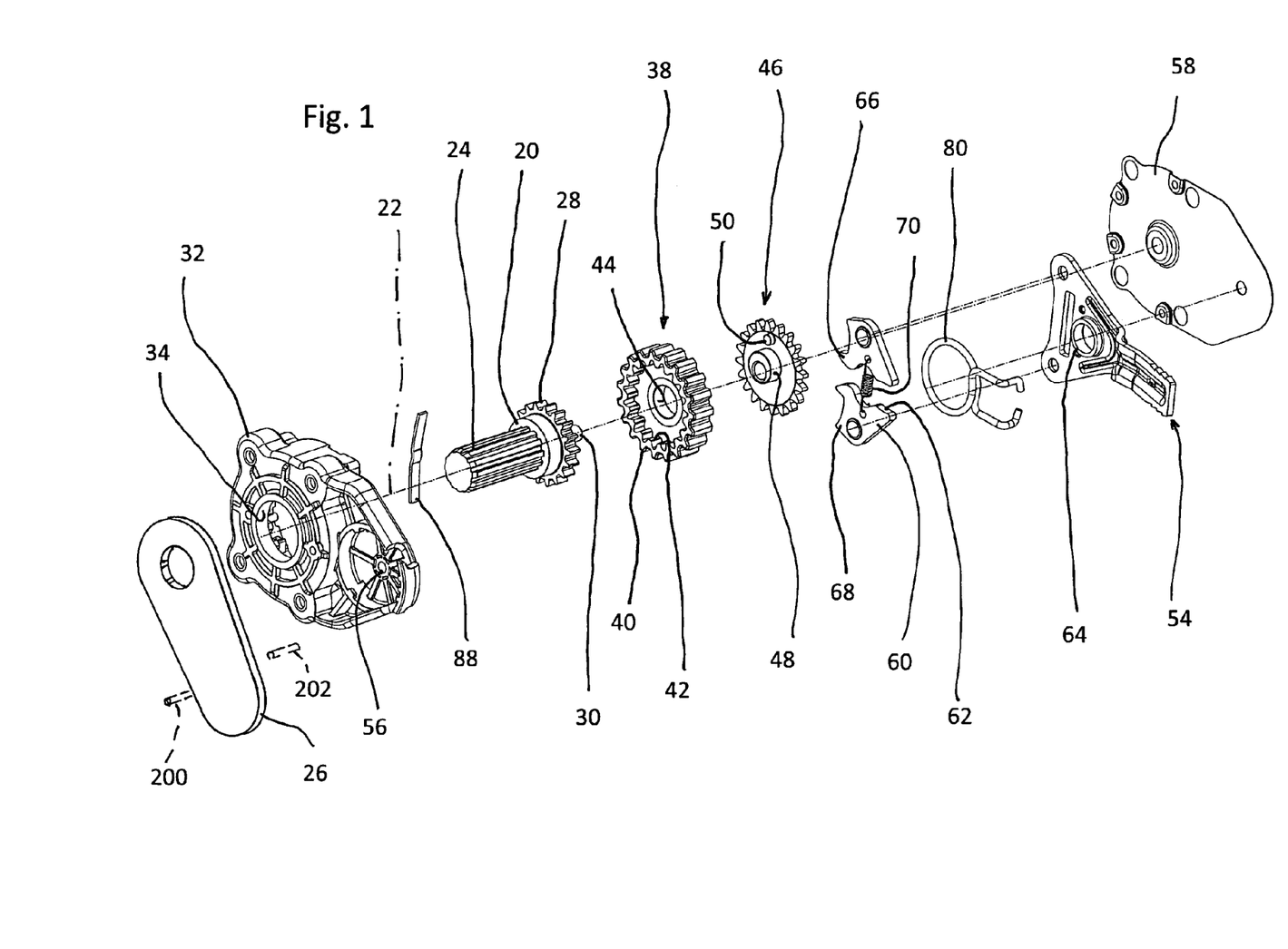
FIG. 1: shows a perspective assembly view of an adjustment device including a rocker of a motor vehicle seat.
Figure 2:
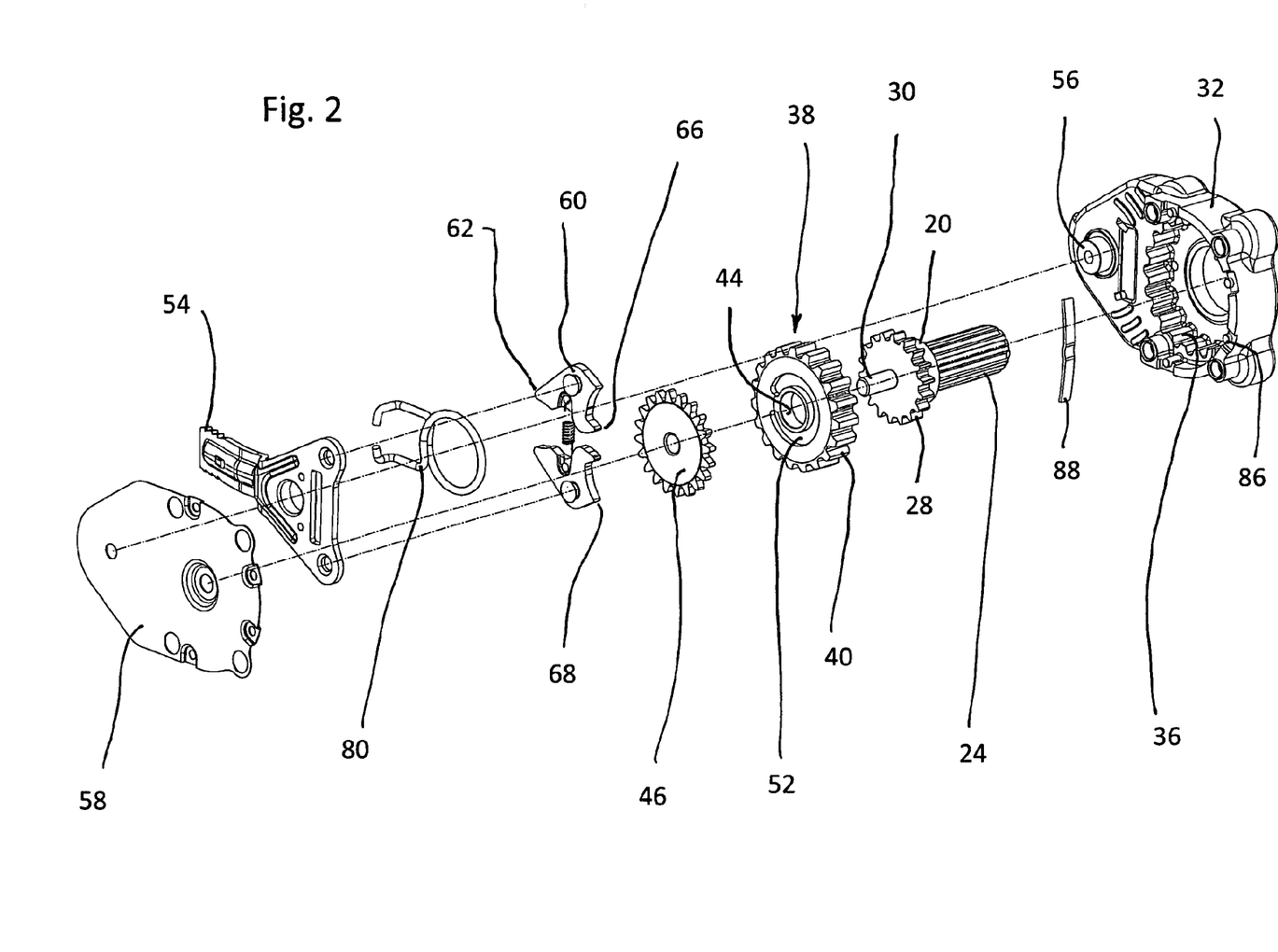
FIG. 2: shows the adjustment device according to FIG. 1 as an assembly view, but seen in another viewing direction, without a rocker.
Figure 3:
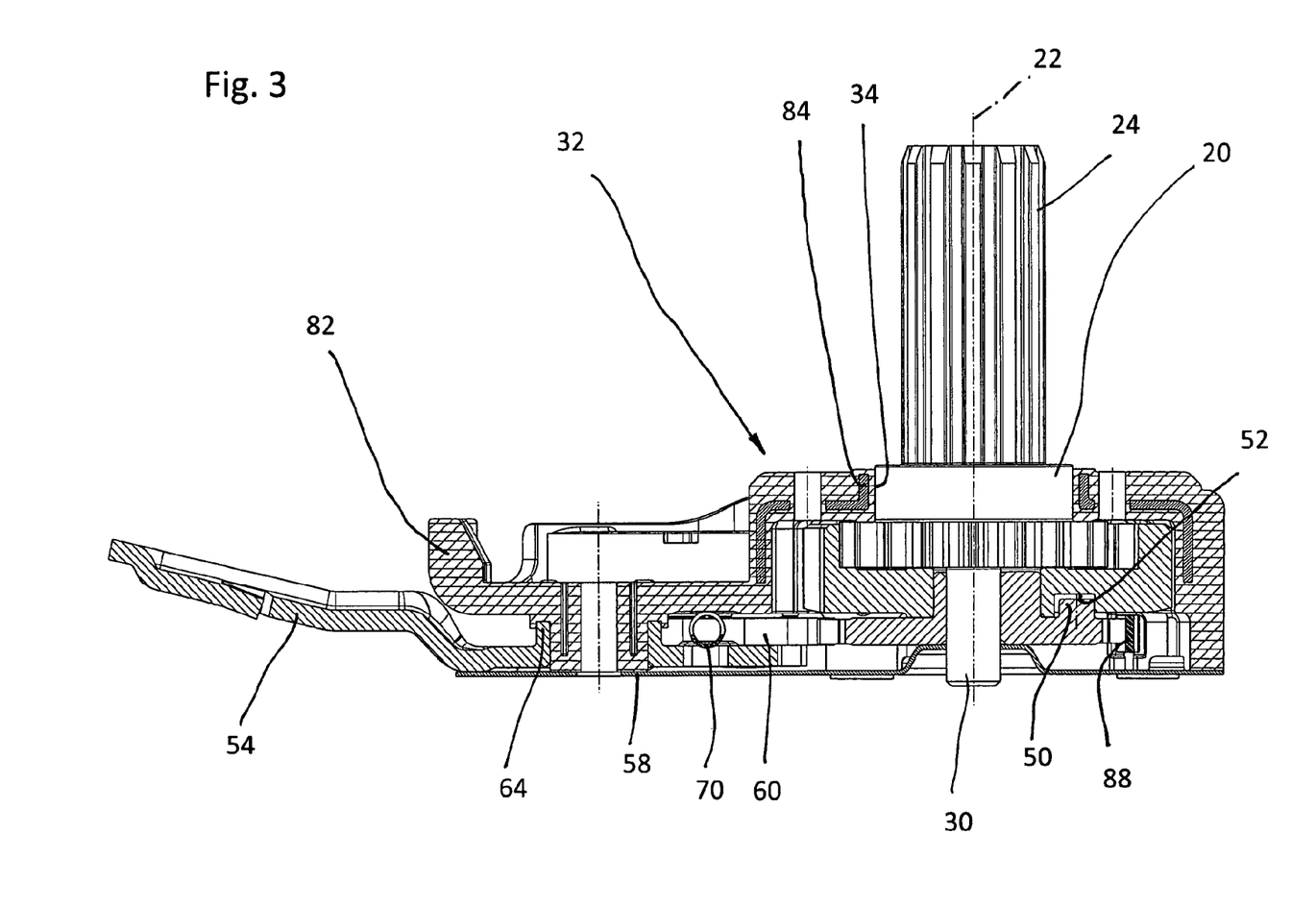
FIG. 3: shows a section through the mounted adjustment device according to FIG. 2 along the sectional plane defined by an axis of the output shaft and a hand lever axis of the hand lever.

According to the prior art, stops 200, 202, which are fixed on the frame, for example provided on the housing portion 32, and which directly limit the range of movement of the rocker 26, are allocated to the rocker 26. In FIG. 1, these stops 200, 202 are shown in dashed lines. According to the invention, such stops 200, 202 are not provided on the element to be adjusted. The pivoting path of the rocker 26 is limited by the stop means, i.e. specifically in the exemplary embodiment by the cooperation of the pin 50 and the ends of the groove 52. The ends of the groove 52 are positioned in such a way that the desired pivot angle is obtained taking into consideration the transmission of the two wobble stages. For example, if the ends of the groove 52 are spaced from each other by 340° and if the transmission ratio of the two wobble stages is 1:10, the pivot angle of the rocker 26 is limited at the points 0° and 34°. The rocker 26 can be moved only over an angle range of 34°. Instead of the pin 50 and the groove, the angle limitation can also be obtained by other means.

In the first exemplary embodiment, the control gear wheel 46, and thus the two wobble stages, are driven by a step-by-step switch. This forms the drive unit. The step-by-step switch has a hand lever 54 pivotable about a bearing means 56 which protrudes in the shape of an axle stub from the housing portion 32 and has a supporting bore hole in a base plate 58. The base plate 58 and the housing portion 32 delimit an interior space in which the parts described up to here, with the exception of the rocker 26, are disposed. The base plate 58 and the housing portion 32 leave a lateral slot through which an actuating arm of the hand lever 54 protrudes towards the outside.

The step-by-step switch further comprises two drivers 60 that are mounted on the hand lever 54 so as to be pivotable about driver axes. The driver axes and the pivot axis of the hand lever 54 are located on the corners of an isosceles triangle. The drivers 60 have three arms. A first arm of each driver 60 carries a driver tooth 66. Controlled by a tilting movement of the hand lever 54, this comes into engagement with a radial toothing of the control gear wheel 46. Each individual driver tooth 66 can be considered a gear wheel that rotates about the pivot axis of the hand lever 54 and comes into engagement with the radial toothing of the control gear wheel 46.

A second arm of the driver 60 carries a tab 68. This tab 68 forms a surface facing towards the radial toothing; this surface comes into contact with a tooth tip of the toothing of the control gear wheel 46 when a driving stroke is complete. The maximum pivoting movement of the hand lever 54 is thus delimited. A third arm forms a stop face 62. The latter normally rests against a collar 64 of the hand lever 54 or, in another configuration, against a bearing shaft of the hand lever 54. This bearing shaft is centric with respect to the lever axis of the hand lever 54.

The two drivers 60 are disposed in mirror-image positions relative to each other. They are identical parts. A tension spring 70 acts with its ends on each driver 60 and pulls the stop faces 62 towards each other so that they rest against the collar 64. A connecting line of the axis 22 and the driver axis of the associated driver 60 extends between the driver tooth 66 and the tab 68. A connecting line of the driver axis and the lever axis of the hand lever 54 extends between the first arm and the third arm.

The step-by-step switch has a spring 80 for the zero position. With respect to its shape, it is adapted to the housing portion 32. It has an annular region which is centric relative to the collar 64 and from which two arms protrude at first radially and then also axially. These arms rest against the hand lever 54 on both sides and keep it in the zero position. Furthermore, the arms rest against pockets formed in the housing portion 32. The wheel of the control gear wheel 46 belongs to the step-by-step switch.

The housing portion 32 is configured as a hybrid part. It is substantially manufactured from plastic; it has a plastic overmolding 82. The latter envelopes a steel insert 84. The plastic overmolding 82 is integral. It forms the internal toothing 36. Four small assembly pins 86 that are disposed in axially recessed indentations so that they do not, as a whole, stand out, protrude on the housing portion 32 along an edge. They cooperate with holes in regions that are offset in the same parallel direction and that are formed in the base plate 58. The assembly pins 86 are plugged through the holes and fixed, e.g. by deformation. Thus, the housing is closed and can be handles as a finished component. Moreover, four retaining regions are provided in the housing portion 32 which correspond to four bore holes in the base plate 58. They are formed by the steel insert 84.

A leaf spring 88 is provided; it rests against the control gear wheel 46. In an alternative, it rests against another rotating part, e.g. an external gear wheel 28 or a shaft. It is inserted into a corresponding pocket of the housing portion 32. It brakes a free rotary movement and is thus of great advantage for the return stroke, particularly in the case of the step-by-step switching device. Preferably, the leaf spring 88 has a small bulge with which it reaches between teeth of the control gear wheel 46. It is opposite the drivers 66.

Figure 4:
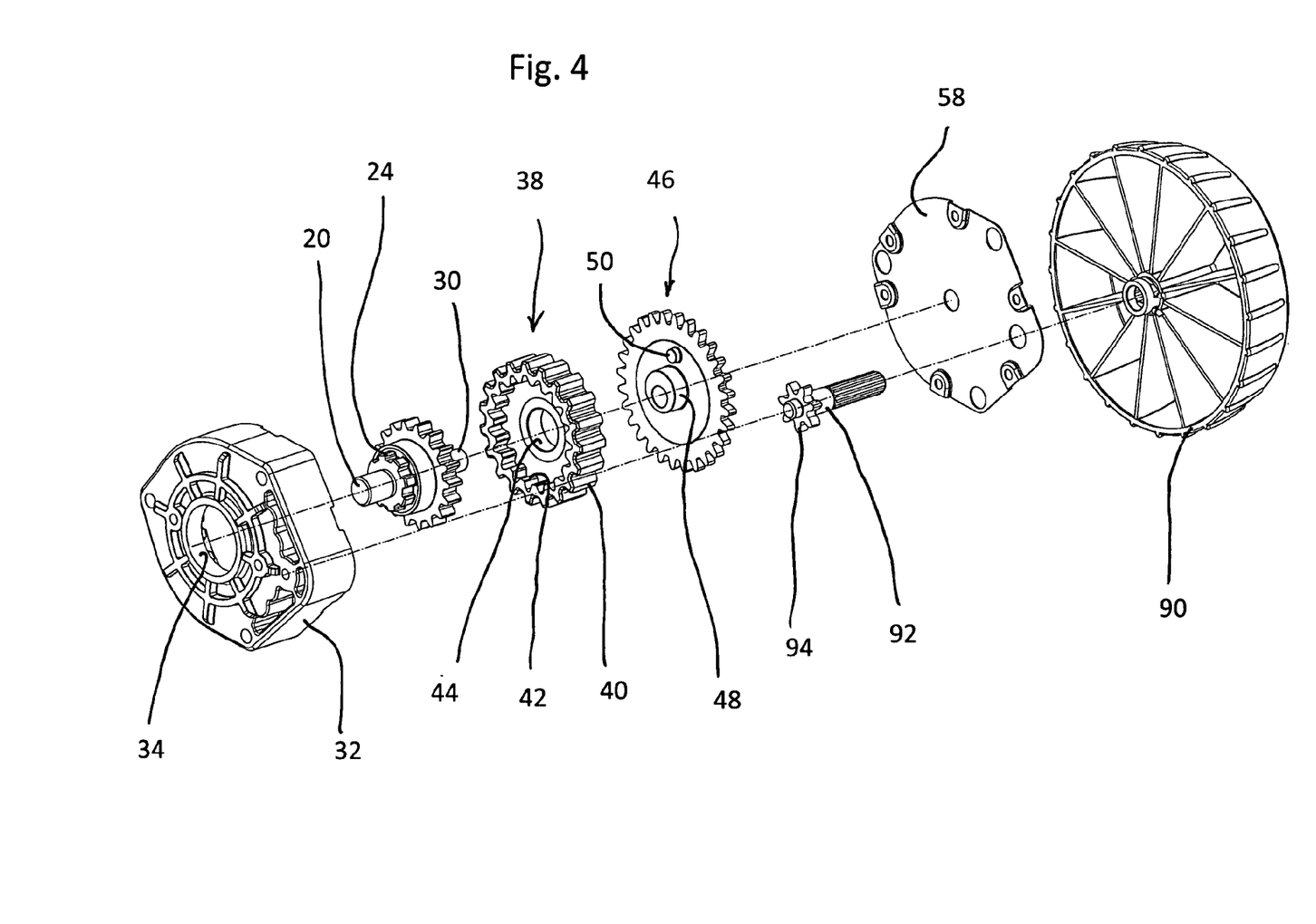
FIG. 4: shows a perspective assembly view of a second configuration with a hand wheel.
Figure 5:
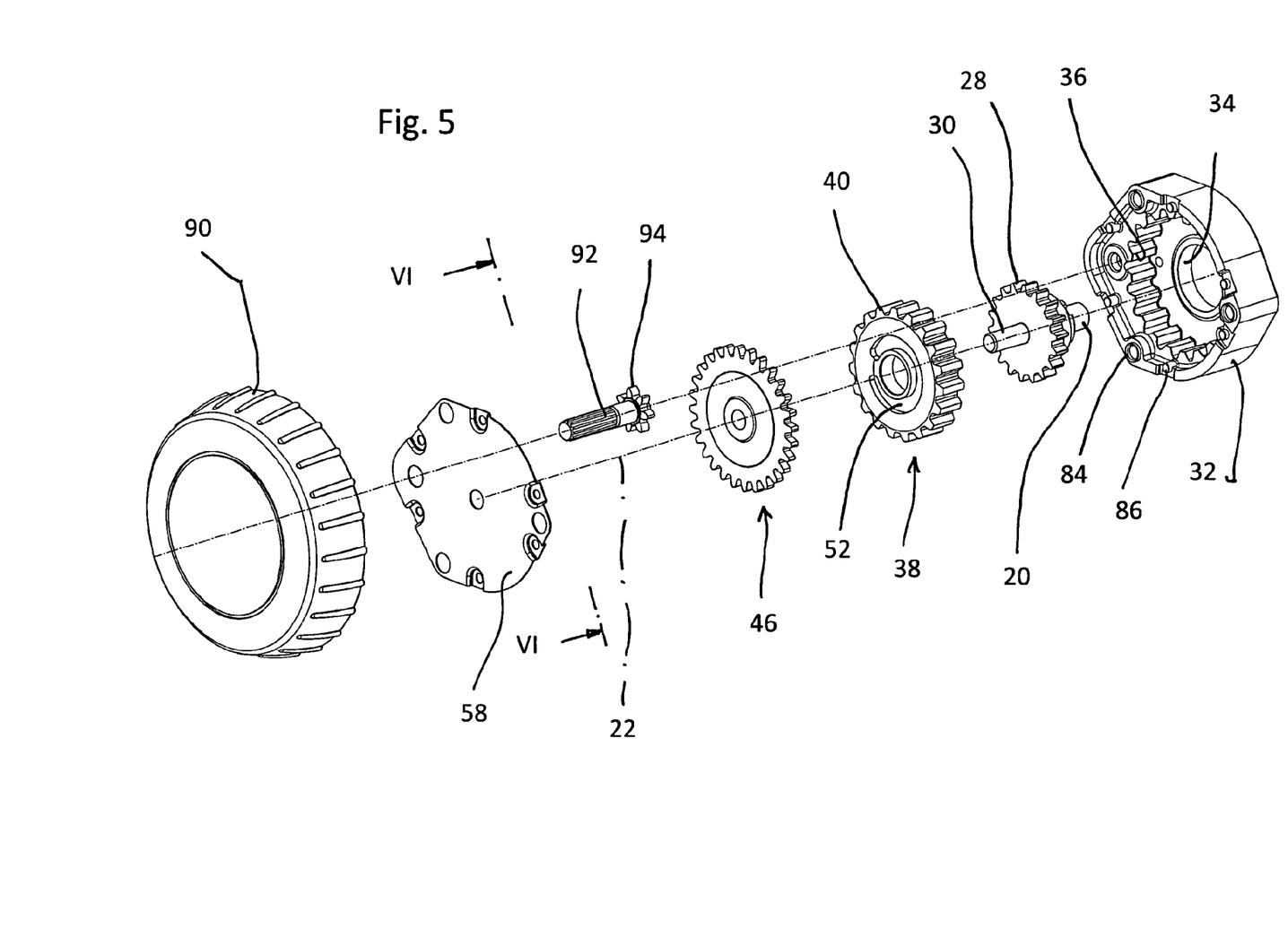
FIG. 5: shows a perspective assembly view of the second configuration seen in another viewing direction.
Figure 6:
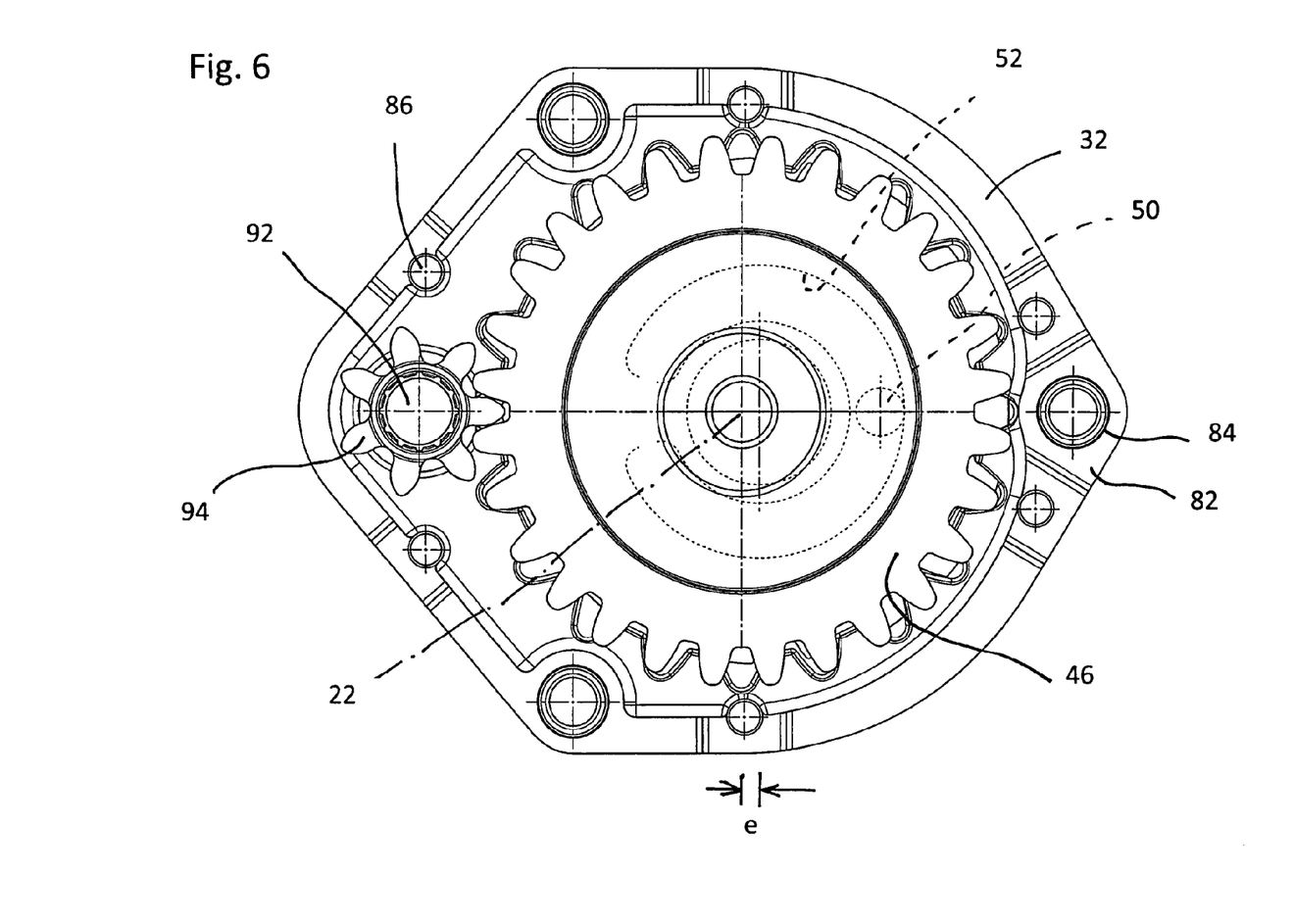
FIG. 6: shows a view in the direction of the arrows VI-VI in FIG. 5, FIG. 7: shows a perspective assembly view of an adjustment device similar to FIG. 1, but with a reversal of movement.

The second exemplary embodiment according to the FIGS. 4 to 6 differs from the first exemplary embodiment substantially in the configuration of the manual drive unit. Now, a hand wheel 90 is used instead of a step-by-step switching device. It is mounted so as to be pivotable about a hand wheel shaft 92; for this purpose, one bearing bore 34 is provided in each of the base plate 58 and in the housing portion 32. The housing portion 32 now has a different shape; it no longer has to accommodate the spring 80 and the leaf spring 88. The spring 80 and the leaf spring 88 are omitted. The wobble stage, and in particular the stop consisting of the pin 50 and the groove 52, are unchanged. A pinion 94, which is rotationally connected to the hand wheel shaft 92, is in engagement with the control gear wheel 46, which is again configured as a radial gear wheel. The pinion 94 and the control gear wheel 46 form a reduction stage. By rotating the hand wheel 90, the pinion 94 is rotated; the latter then drives the control gear wheel 46 to execute a rotary movement. A transmission of 1:3 to 1:4 is achieved between the pinion 94 and the control gear wheel 46. Overall, a transmission of 1:25 to 1:50 is provided between the hand wheel 90 and the element 26 to be actuated.

The third exemplary embodiment according to FIG. 7 differs from the first exemplary embodiment in the following: A step-by-step switch is again used as the drive means. This, however, is configured differently from the first exemplary embodiment. The wheel of the control gear wheel 46, which again has a radial toothing, is associated with an intermediate gear wheel 96, which is located in the same plane as the wheel of the control gear wheel 46 and is in toothed engagement therewith. Axially behind this intermediate gear wheel 96, there is located a driver gear wheel 98 that is rotationally connected therewith and also comprises an external toothing. This external toothing is considerably more finely stepped, at least by the factor 2, preferably finer by at least the factor 4 than the toothing of the intermediate gear wheel 96. It has more teeth by the specified factor. The only one driver 60 comes into engagement with the driver gear wheel 98.

The driver gear wheel 98 is part of a step-by-step switch configured in accordance with the above-mentioned German patent application 10 2010 044 081. It comprises a hand lever 54 having a supporting surface for a spring 80 (not shown in FIG. 7), which is configured as a leg spring, as in the first exemplary embodiment. It is also referred to as zero position spring. A drag lever 100 is provided which is coaxial with the intermediate gear wheel 96 and grasps around the driver gear wheel 98. It supports the integrally configured driver 60. Instead of the leaf spring 88, a retaining spring 102 is now provided which cooperates with bulges on the drag lever 100. A reversal of movement is accomplished by means of the intermediate gear wheel 96. If the hand lever 54 is lifted, i.e. rotated in a counterclockwise direction, the intermediate gear wheel 96 rotates in the same direction and the control gear wheel 46 in the opposite direction. The drag lever 100 has a recess in which the sole driver 60 is located. This recess grasps around the control gear wheel 46 and is sealed in a radially inward direction by the control gear wheel 46. The hand lever 54 covers the recess in the axial direction.

In contrast to the exemplary embodiments discussed so far, the stop means consisting of a pin 50 and an arc-shaped groove 52 is now configured differently. The pin 50 protrudes axially on the side of the control gear wheel 46 which faces away from the eccentric protrusion 48. The groove 52 which the pin 50 engages is now fixed in the housing. Specifically, it is formed on an intermediate portion 106 that is firmly connected to the housing portion 32 and the base plate 58.

Figure 8:
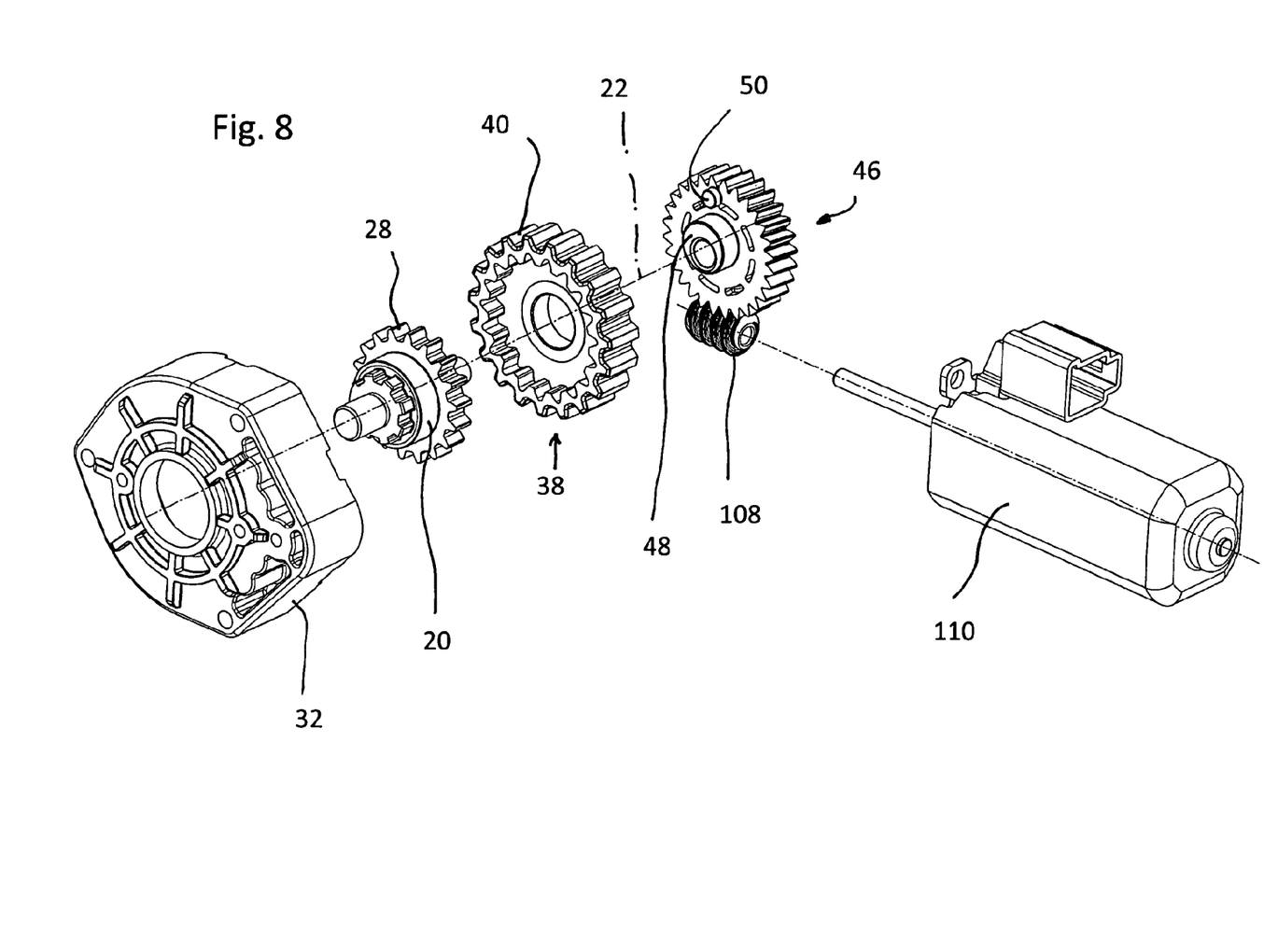
FIG. 8: shows a perspective assembly view of a third configuration with an electric motor.
Figure 9:
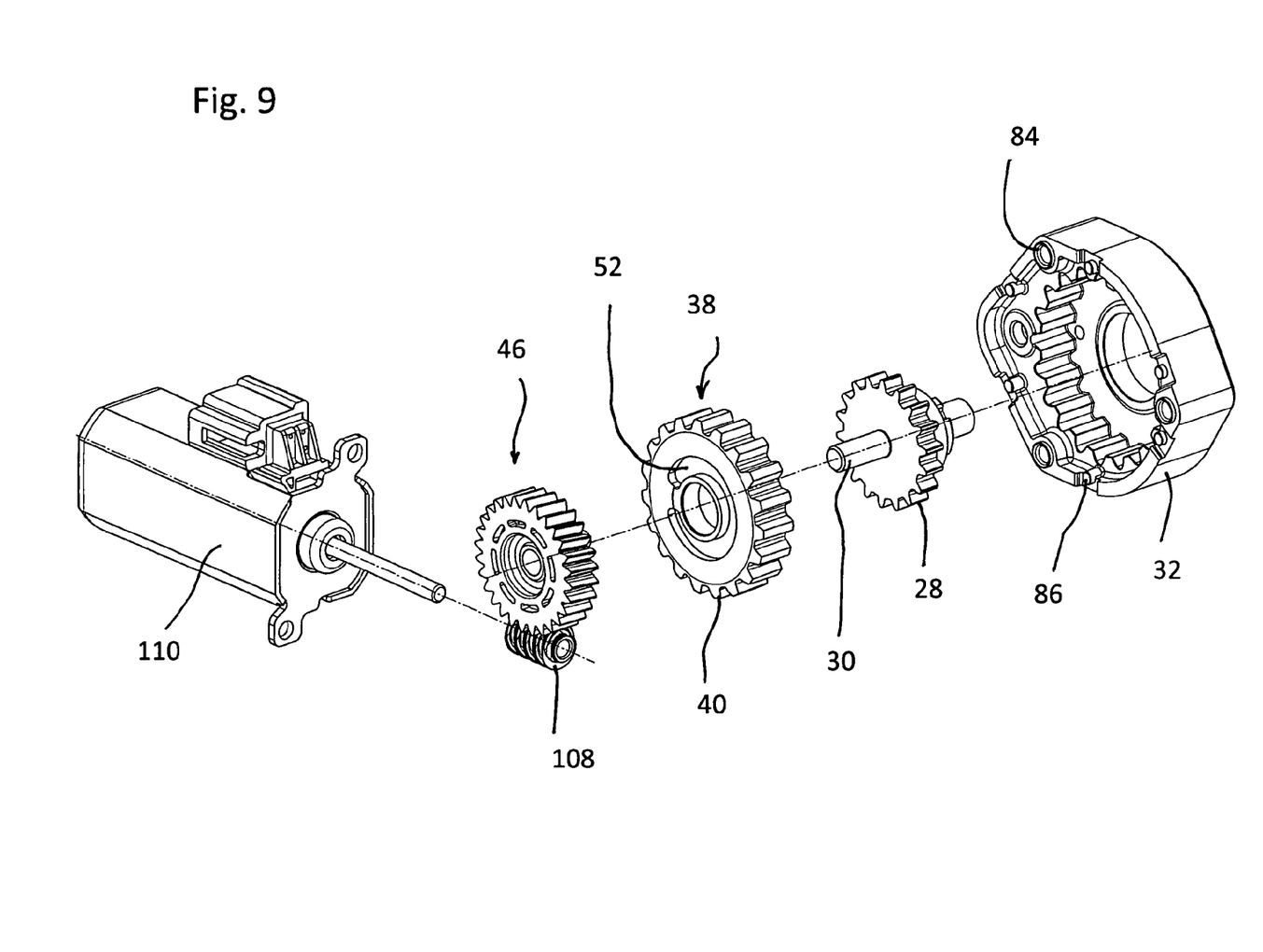
FIG. 9: shows a perspective assembly view of the third configuration seen in another viewing direction.

In the fourth exemplary embodiment according to the FIGS. 8 and 9, the third alternative of the drive unit of an adjustment device is realized. The difference to the second exemplary embodiment is the following: the three parts located on the left on the control gear wheel 46 in FIG. 4 are unchanged. The stop means is also configured as in the second exemplary embodiment. The wheel of the control gear wheel 46 now does not have a radial toothing but is configured as a worm wheel. It is in engagement with a worm 108 driven by an electric motor 110.

Figure 7:
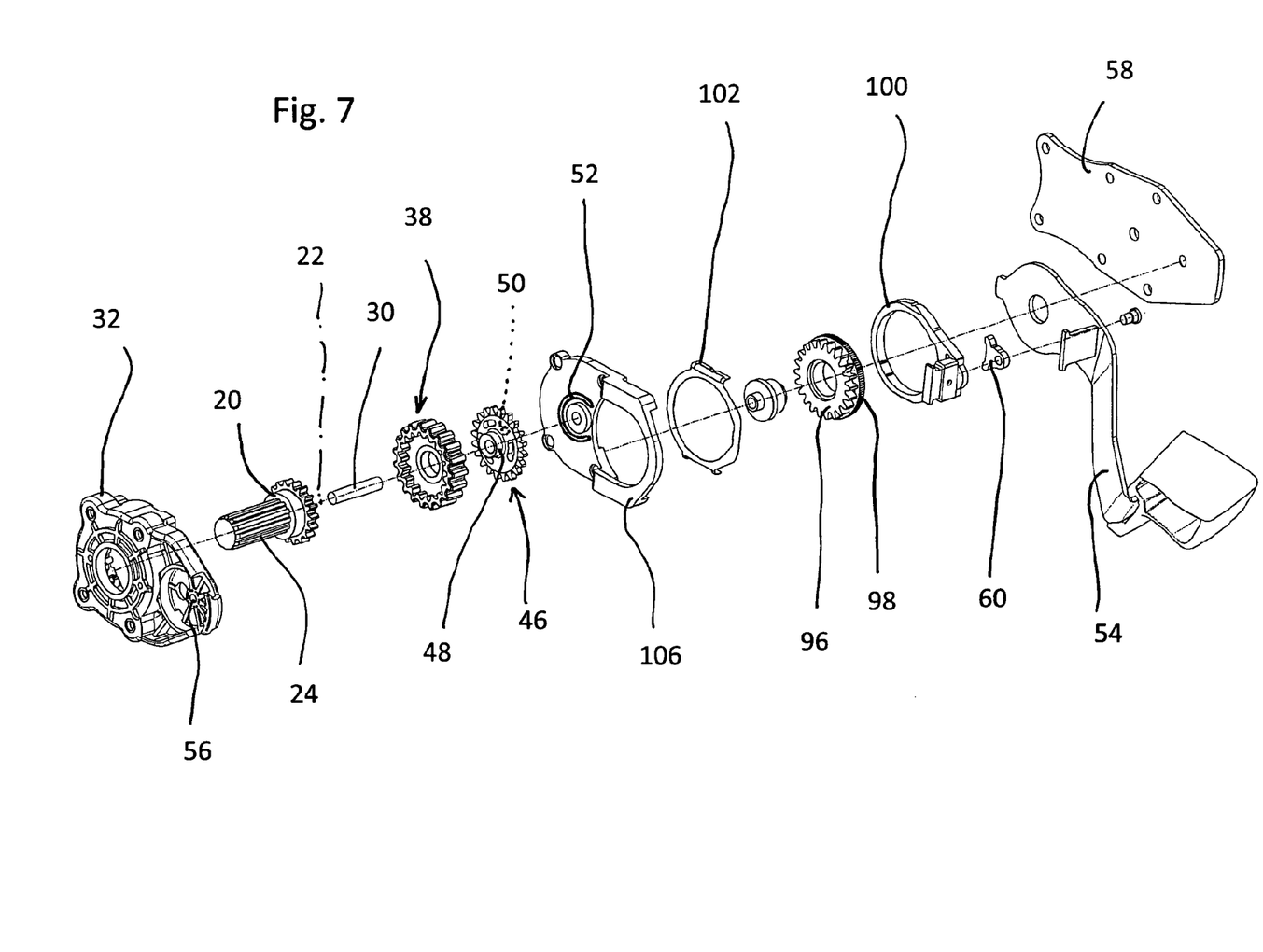
Figure 10:
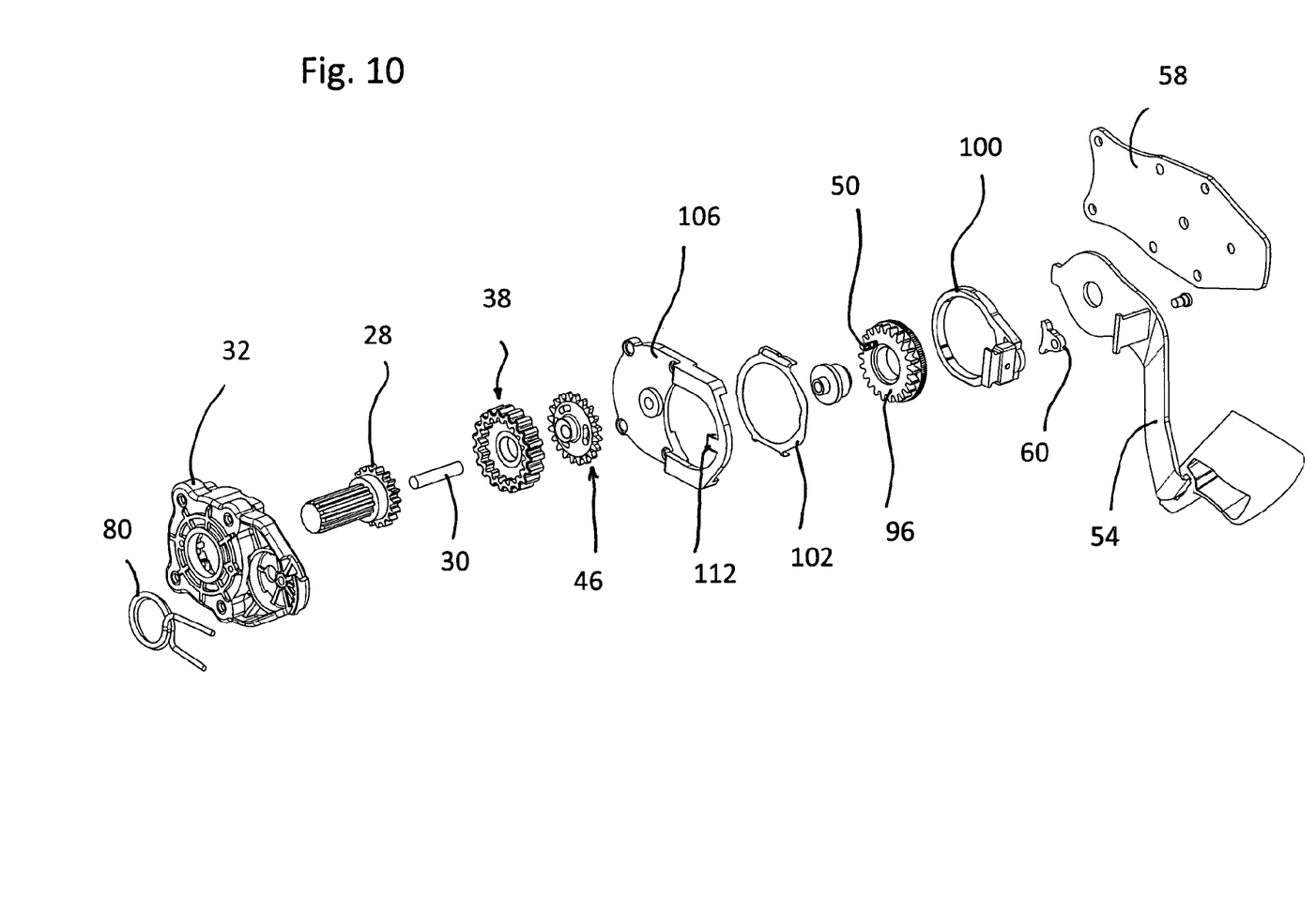
FIG. 10: shows a perspective assembly view of an adjustment device similar to FIG. 7, but with a different stop means.

The fifth exemplary embodiment according to FIG. 10 corresponds to the third exemplary embodiment according to FIG. 7, but the stop means is now altered. The pin 50 now protrudes on the intermediate gear wheel 96. It cooperates with a counter-stop formed by a projection 112; this projection 112 is part of the intermediate portion 106. Thus, the stop means is located between the drive unit and the housing portion 32. Accordingly, in the fifth exemplary embodiment, the first stop means is formed by a surface of the pin 50 and a surface of the projection 102. The second stop means is formed by another, diametrically opposite surface of the pin 50 and the opposite surface of the projection 102.

The terms eccentric and wobble are used synonymously. Thus, a wobble stage is an eccentric stage.

The invention claimed is:

1. An adjustment device for a pivot joint fitting of a motor vehicle seat, comprising:
   a housing portion;
   a drive unit;
   a gear unit, which is downstream from the drive unit, is driven by the drive unit, has at least one self-locking gear, and drives an output shaft, wherein the self-locking gear is an eccentric gear and comprises an annular gear wheel and an eccentric protrusion;
   an arm that can be adjusted within a pivoting range about an axis of the pivot joint fitting, which arm is rotationally connected to the output shaft and is adjustable in an angle range ≤360° about the axis of the joint fitting; and
   at least one stop mechanism that limits the pivoting range of the arm at least in one first pivoting direction,
   wherein the stop mechanism comprises a first stop disposed on a control gear wheel having the eccentric protrusion, and the stop mechanism further comprises a first counter-stop disposed on the annular gear wheel, the first counter-stop is in contact with the first stop when the arm is located at a first end of the pivoting range.

2. The adjustment device according to claim 1, wherein the stop mechanism limits the pivoting range of the arm in both pivoting directions, or a first stop mechanism is provided for a first pivoting direction and a second stop mechanism for the second pivoting direction.

3. The adjustment device according to claim 1, wherein the drive unit comprises a manually operable hand wheel, a manually operable hand lever or an electric motor.

4. The adjustment device according to claim 1, wherein the drive unit comprises a transmission or a reduction stage.

5. The adjustment device according to claim 1, wherein no stops are allocated directly to the arm to be adjusted.

6. The adjustment device according to claim 1, wherein the arm is adjustable in an angle range ≤90 degrees.

* * * * *